(12) United States Patent
Stickel et al.

(10) Patent No.: US 8,211,560 B2
(45) Date of Patent: Jul. 3, 2012

(54) BATTERY PACK AND HAND-HELD POWER TOOL

(75) Inventors: Wolfgang Stickel, Beuren (DE); Olaf Schmid, Stuttgart (DE)

(73) Assignee: Metabowerke GmbH (DE)

( * ) Notice: Subject to any disclaimer, the term of this patent is extended or adjusted under 35 U.S.C. 154(b) by 1034 days.

(21) Appl. No.: 12/067,421

(22) PCT Filed: Sep. 20, 2005

(86) PCT No.: PCT/EP2005/010109
§ 371 (c)(1),
(2), (4) Date: Mar. 19, 2008

(87) PCT Pub. No.: WO2007/033690
PCT Pub. Date: Mar. 29, 2007

(65) Prior Publication Data
US 2009/0123817 A1    May 14, 2009

(51) Int. Cl.
*H01M 2/00*    (2006.01)

(52) U.S. Cl. .............................. 429/91; 429/90; 429/92

(58) Field of Classification Search .................. None
See application file for complete search history.

(56) References Cited

U.S. PATENT DOCUMENTS

| 5,038,481 A * | 8/1991 | Smith ............................. 30/392 |
| 5,949,219 A * | 9/1999 | Weiss ............................ 320/136 |
| 6,072,299 A * | 6/2000 | Kurle et al. ................... 320/112 |

FOREIGN PATENT DOCUMENTS

| DE | 42 34 231 A1 | 4/1994 |
| EP | 0 709 910 A1 | 5/1996 |
| EP | 1 130 672 A2 | 9/2001 |

* cited by examiner

*Primary Examiner* — Patrick Ryan
*Assistant Examiner* — Wyatt McConnell
(74) *Attorney, Agent, or Firm* — Paine Hamblen LLP

(57) ABSTRACT

The invention relates to a battery pack, especially for a hand-held power tool. Said battery pack comprises a battery housing (10) and an electronic unit (16) housed in said battery housing (10). The electronic unit (16) has one or more light sources (18). A first light-guiding element (28) can be inserted into the battery housing (10) and interacts with the at least one light source (18) in such a manner that the light emitted by the at least one light source (18) can be injected into the first light-guiding element (28).

15 Claims, 2 Drawing Sheets

BATTERY PACK AND HAND-HELD POWER TOOL

Figure 1:
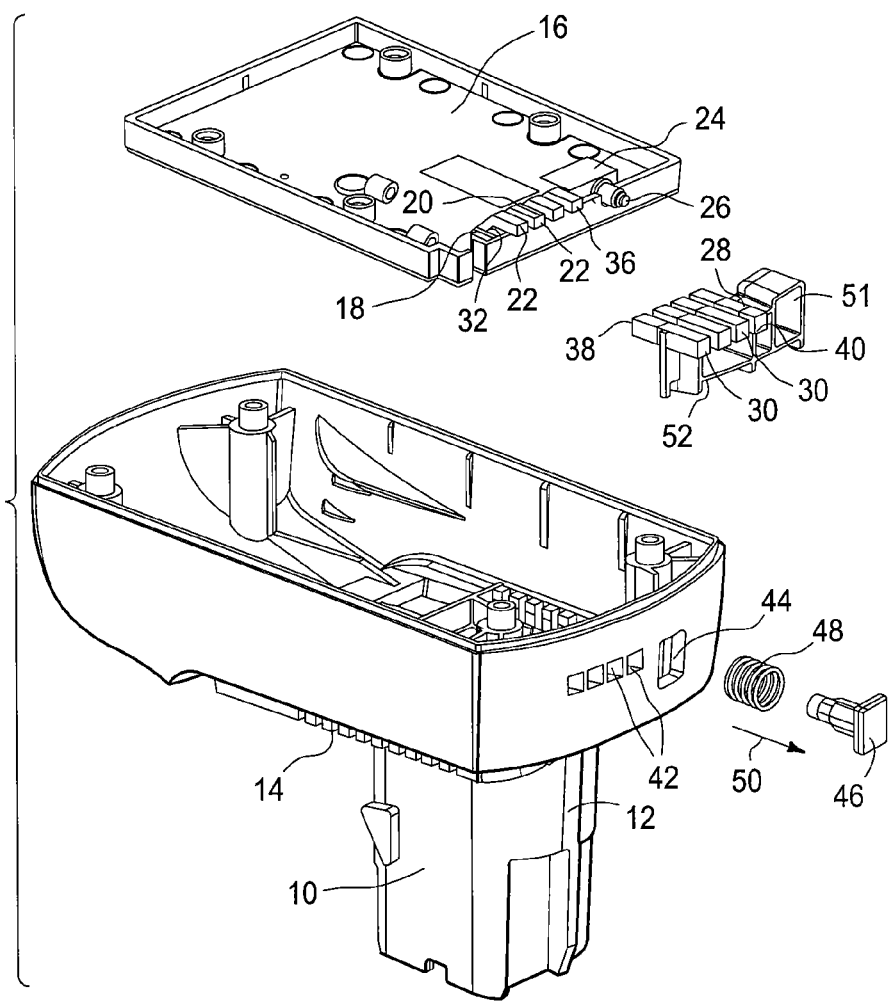

The invention relates to a rechargeable battery pack, in particular for a hand-held power tool, with a battery housing and an electronics unit housed in the battery housing.

Battery packs are often used in hand-held power tools for driving a motor that is housed in the hand-held power tool and that in turn drives a tool. Typically, the battery pack is locked together with the housing of the unit in a detachable manner.

The use of hand-held power tool units operated by batteries is desirable, in particular because they offer greater flexibility when working and provide in particular an independence from an existing power source, allowing for performing work outside in many locations. When coupling the housing of the unit and the battery pack, the motor is electrically coupled to the battery pack and is supplied with electricity. To couple the two housings, the battery housing is typically provided with a protruding locking device that is inserted into and engages in a complementing socket of the tool housing. The electrical contacts are often in the area of the locking device, together with the mechanical locking.

Such a hand-held power tool is known, for example, from DE 42 34 231 A1, which discloses, in particular, the use of a temperature sensor for controlling the charging process. Recently, there is an increased effort to use lithium ion batteries that include an electronics unit in the battery housing.

To provide an indicator to display the charge level of the battery pack is also known from the state-of-the-art. Preferably, the indication is done optically.

The problem with all mechanical and electrical connections is, however, that the battery pack together with the hand-held power tool is at times subjected to significant vibrations during operation.

Such stress not only concerns the mechanical attachment components but also the establishment of the electrical contacts.

It is, therefore, the objective of this invention to provide a charge level indicator for a battery pack that allows for the greatest possible degree of flexibility for the arrangement and at the same time is functionally unproblematic.

The invention accomplishes this objective through a battery pack of the generic kind for which the electronics unit includes one or more light sources and where in the battery housing a first light-guiding element can be inserted that interacts with the at least one light source in such a manner that the light emitted by the at least one light source can be injected into the first light-guiding element.

By using light guide elements, a spatial separation of the arrangement of the light source and that of the light emitting device can be provided. In this manner, it is in particular possible to flexibly arrange the light sources in the battery housing or at the electronics unit, respectively. In addition, this arrangement has the advantage that a spatial separation, in particular a gap, can be provided between the light source and the first light-guiding element such that the light source and the light-guiding element are decoupled from each other with regard to vibrations, thus greatly reducing wear and susceptibility to failure.

According to a first embodiment, it can, therefore, be provided that the at least one light source injects the light into the first light-guiding element in a non-contact manner and that preferably a gap is provided between the light source and the first light-guiding element. This reduces the mechanical susceptibility to failure. However, the gap shall be as small as possible in order to minimize the light losses.

In addition, it can be provided that the first light-guiding element exhibits a receptacle for a switch actuating element. In particular, it can be provided that the light-guiding element is made of a fully light-guiding synthetic material and that a receptacle, in particular a recess for receiving a switch actuating element is provided in the light-guiding element.

According to the invention, the switch actuating element can also be provided when no contact-free coupling of the first light-guiding element to the light source is intended. In this manner, a flexible arrangement of the light source in the battery housing in relation to the light emitting area is achieved resulting in space savings or better space utilization, respectively. Furthermore, by coupling two functions in one component, namely the charge level indicator and the receptacle for a switch actuating element, the required number of components is reduced. In addition, it can be provided that the light sources interact with second light-guiding elements that inject the light into the first light-guiding element. The second light-guiding element is preferably located at the electronics unit. The benefit of such a design is that the one or more light sources can be arranged in any desired manner at the electronics unit. The light can be guided via a second light-guiding element, which interacts in a non-contact or contact manner with the light source or the light sources, to the first light-guiding element.

A gap can be provided between the two light-guiding elements in order to provide decoupling with regard to vibration. The gap can be designed to be as small as possible, such that in any case, a secure light transfer is ensured. This also accomplishes that the two light-guiding elements can be designed relatively short. In this arrangement, the second light-guiding element is assigned to the pc-board, i.e., essentially to the battery inside, and the first light-guiding element to the battery housing, i.e., the battery outside, whereby these two areas are preferably separated from each other with regard to vibration, namely the outer area with the locking device to the electric unit and the battery inside area with the battery cells and the electronics.

It is particularly advantageous to provide that the first and/or the second light-guiding element comprise light-guiding zones, whereby several light sources are provided and to each light source is assigned one light-guiding zone in the light-guiding elements and that the light-guiding zones are essentially optically separated from each other. Thus, it can be provided in particular that longitudinal light-guiding zones are provided in both the first and the second light-guiding element, whereby one light-guiding zone each in the first light-guiding element corresponds to one zone in the second light-guiding element. In this manner, the light-guiding zones exhibit border areas at their face areas that enable the light emission. The light can then pass from the light emitting area of one light-guiding element into the other light-guiding element via a light emitting area of said other light-guiding element. The zones of the light-guiding elements themselves are separated from each other through additional border areas such that light that enters into one light-guiding zone exits the light-guiding zone at the face area of the opposite end of the light-guiding zone when viewed in the longitudinal direction of the light-guiding zone, in a manner that no irradiation occurs into the area of additional light-guiding zones, for example via the lateral surface area. For example, four light-guiding zones may be provided whereby each light-guiding zone displays a charge level of about 25%. Thus, the battery is fully charged if all four light emitting areas that correspond to a light-guiding zone are lit. If only two light emitting areas of the first light-guiding element, which are fed by two light-guiding zones, are lit, then the battery has a charge of only 50%, giving the user an indication about the remaining working time with a respective battery-operated unit or how much longer the recharging may take.

The design of the light-guiding zones can be realized with the border area design between the individual light-guiding zones.

Additionally it can be provided that the electronics unit includes a switch that interacts with the switch actuating element. It can be provided that the switch actuating element is spring-loaded away from the switch. This also achieves that the two components, switch and switch actuating element, are separated from one another such that largely a decoupling with regard to vibration is provided as is necessary for the components inside a battery pack. In particular it can be provided that LEDs are used as the light sources. LEDs have the advantage of a long service life and low susceptibility to wear. In particular, LEDs can be used during numerous switching actions. In addition, LEDs offer the advantage that they present only a low thermal load for the light-guiding elements, such that light-guiding elements made of synthetic materials can be used without the need to provide infrared filters or connecting optical fiber ahead in series. This can additionally reduce the costs for an appropriate charge level indicator.

It can be provided that the first light-guiding element is positively held in the battery housing, in particular snapped into the housing. In this manner, a connection that is simple to install and inexpensive to establish can be created. Alternatively, other types of connections such as gluing can be considered. The first light-guiding element as well as the second light-guiding element can be made as injection molded components, whereby the first light-guiding element includes at the same time the receptacle for the switch actuating element. This dual functionality can save additional costs and simplify the assembly. The light-guiding elements can be designed transparent or colored. In particular, the individual light-guiding zones can exhibit different colors to increase the signaling effect. Lithium ion cells are preferably used as the battery cells.

In addition, the invention relates to a hand-held power tool that uses a battery pack of the kind described above as well as the use of a battery pack for a hand-held power tool, whereby the battery pack can be mechanically connected to the hand-held power tool via its battery housing, and whereby together with the mechanical connection an electrical contact is established that allows for driving a hand-held power tool from the battery.

Additional advantages and features of the invention become apparent from the other application documents. In the following, the invention shall be described in greater detail using a drawing, whereby FIG. 1 is an exploded view of a battery housing as well as the light guide and the electronics unit, and FIG. 2 shows a detail of a section through a battery pack.

Figure 2:
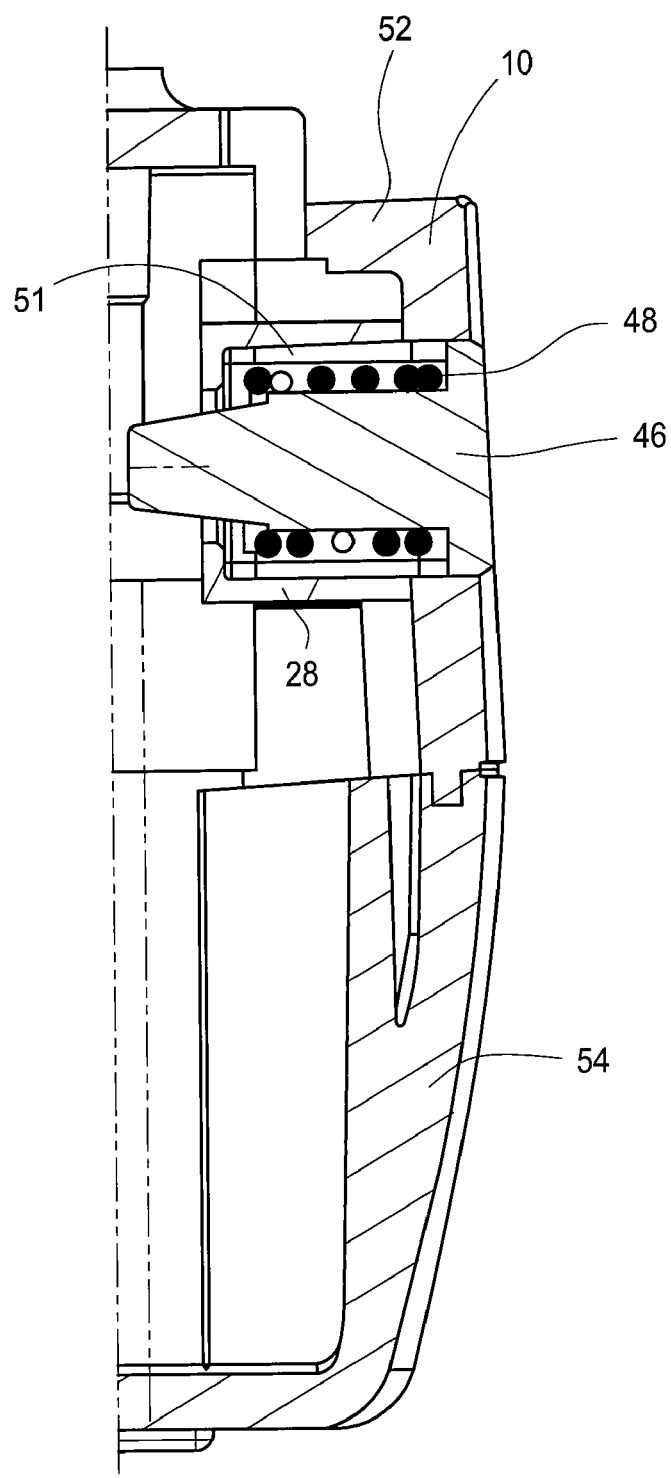

FIG. 1 shows a battery housing with the reference character 10 with regard to its upper housing shell.

In addition, the battery housing 10 comprises a lower shell (not shown).

The housing 10 includes a connection element 12 that is inserted into a respective recess (not shown) of a hand-held power tool and there provides the mechanical latching but also establishes the electrical contact between the battery and the hand-held power tool.

In addition, ventilation slots 14 are provided that enable cooling of the battery cells (not shown) in the assembled condition.

An electronics unit 16 is placed into the housing shell and is locked in place there. Here, the electronics unit 16 utilizes four LEDs as light sources 18 as well as a second light-guiding element 20, whereby the second light-guiding element 20 exhibits light-guiding zones 22 and each light-guiding zone 22 corresponds to a light source 18. Furthermore, the light-guiding zones are connected to one another but are essentially decoupled from each other with regard to the light. In addition, a switch 24 is installed on the electronics unit 16, where said switch includes a button 26 that can be moved in its longitudinal direction.

Finally, a first light-guiding element 28 is provided that is placed into the battery housing 10 and that can be positively locked in place with the battery housing 10, whereby either the battery housing 10 or the first light-guiding element 28 exhibits catch elements that reach behind respective holding protrusions of the other component in the locked condition.

The first and second light-guiding elements 20, 28 are made entirely of a light-guiding synthetic material, and the first light-guiding element 28 exhibits, just as the second light-guiding element 20 four light-guiding zones 30, whereby each light-guiding zone 30 has a longitudinal shape with a rectangular cross-section and each light-guiding zone 30 of the first light-guiding element 28 corresponds to a light-guiding zone 22 of the second light-guiding element 20, and light-wise is connected to it. In the assembled condition, a certain space or gap is present between the light-guiding elements 20 and 28.

If light of a light source 18 is now injected via a light injection area 32 into a light-guiding zone 22 of the second light-guiding element 20 via a face area, a rather extensive reflection of the irradiation occurs at the lateral surface areas of the light-guiding zone 22. At the face area 36 of the light-guiding zone 22 that is located opposite to the entry face area, the radiation exits largely without loss. After exiting the light-guiding zone 22 of the second light-guiding element 20, the radiation is injected into respective associated light injection areas 38 of a light-guiding zone 30 of the first light-guiding element 28 and here too is guided along in the longitudinal direction of the light-guiding zone 30, again with very little radiation loss via the lateral surface areas of the light-guiding zone 30. In particular, it is not desirable if the light radiation of a light source 18 illuminates an another light-guiding zone 30 of the light-guiding element 28 in addition to the one intended.

After passing through the respective light-guiding zone 30 of the first light-guiding element 28, the radiation exits the respective light-guiding zone 30 via a face area that serves as the light decoupling area 40, whereby the light decoupling area 40 is arranged in the area of an opening 42 in the battery housing 10. It can be provided that the light-guiding element 28 with its light-guiding zones 30 does not protrude outward beyond the battery housing 10. In the battery housing 10, four recesses 42 are provided corresponding to the number of light-guiding zones 30. In addition, the housing 10 has an additional recess 44 for receiving a switch actuating element 46, which is spring-supported via the spring 48 that pre-loads the switch actuating element 46 in the direction of the arrow 50.

To specify the location of the switch actuating element 46, it is now provided that a receptacle 50 for the switch actuating element 46 is provided in the light-guiding element 28 whereby the receptacle 51 is connected to the light guiding zones 30 via connection fins 52 of the light guiding element 28. However, this connection does not constitute an optical connection. In this manner, it is possible to reduce the overall number of parts, reducing costs and simplifying the assembly. In particular fewer fitting accuracies and tolerances need to be observed.

In this arrangement, the switch actuating element 46 interacts with the switch 26 that is located on the electronics unit 16. The switch actuating element 46 is locked in place with the light-guiding element 28, which again is located positively in the housing 10.

FIG. 2 shows a sectional view, where the housing 10 is shown with regard to its upper housing shell 52 and its lower housing shell 54. The switch actuating element 46 is arranged in the upper housing shell 52 and is pre-loaded via the spring 48 in the direction of its longitudinal axis out of the housing.

Receiving and locating the switch actuating element 46 is carried out in the first light-guiding element 28. The light-guiding zones 30 of the first light-guiding element 28 are shown in FIG. 2. The individual battery cells, which in the end serve the purpose of driving the hand-held power tool are received by the housing half 54, whereby the battery cells themselves are electrically connected with the electronics unit 16. The battery cells used in this case and received by the housing half 54 are lithium ion cells.

In the manner described above, a battery pack as well as a hand-held power tool can be provided, where the manufacturing costs are reduced and in addition the assembly is simplified due to the reduction in parts. In addition, a small gap is provided between the first light-guiding element 28 with regard to its light-guiding zones 30 and their light injection areas 38 and the second light-guiding element 18 with regard to its light-guiding zone 22 and their light decoupling areas 36, such that vibrations due to the movement of a hand-held power tool are not transferred from the machine housing to the battery housing and from there to the electronics.

According to the invention, the susceptibility to wear can be reduced significantly. Additional decoupling with regard to vibration is carried out using the spring 48 between the switch actuating element 46 and the switch 26.

The invention claimed is:

1. A battery pack for use with a hand-held power tool, comprising:
   a battery housing defining an internal cavity, and wherein a multiplicity of recesses are formed in the battery housing and which individually extend through the battery housing and are each coupled with the internal cavity of the battery housing;
   a battery received within the internal cavity of the battery housing and which, when appropriately charged, produces a source of electricity for use by the hand-held power tool;
   an electronics unit electrically coupled to the battery, and located within the internal cavity of the battery housing;
   a plurality of light emitting diodes (LEDs) mounted on the electronics unit, and selectively, electrically coupled with the battery by way of the electronics unit, and which, when selectively energized by the electronics unit, emits light;
   a first longitudinally elongated light guiding element mounted on the battery housing, and within the internal cavity, and which further defines a plurality of discrete light guiding zones, and wherein the respective light guiding zones of the first longitudinally elongated light guiding element each have a first light entry face; and an opposite, second, light decoupling face which are individually received in the respective recesses formed in the battery housing, and wherein the emitted light received at the first light entry face is passed along the respective light guiding zones, and departs from the second light decoupling face, and may be observed from a location which is outside of the battery housing, and wherein the respective light guiding zones are decoupled, one relative to the others, as to the transmission of light therebetween adjacently positioned light guiding zones; and
   a second light guiding element mounted on the electronics unit, and located within the internal cavity of the battery housing, and wherein the second light guiding element further defines a plurality of discrete light guiding zones which individually correspond in number to the plurality of light emitting diodes mounted on the electronics unit, and wherein the respective light guiding zones defined by the second light guiding element each have a first, light entry face which is located in spaced relation relative to an adjacent LED, and an opposite, second, light decoupling face which is located in an aligned, spaced, light transmitting relationship relative to the light entry face of an adjacent light guiding zone as defined by the first longitudinally elongated light guiding element, and wherein the light emitted by an energized LED passes along individual light guiding zones of the first and second light guiding elements and is observable from a location exterior to the battery housing, and wherein the battery housing is subjected to a source of vibratory energy when the hand-held power tool is in use, and wherein the vibratory energy imparted to the battery housing is not transmitted by way of the first longitudinally elongated light guiding element to the electronics unit so as to impede vibratory damage from being imparted to the electronics unit.

2. A battery pack as claimed in claim 1, and wherein the battery comprises a lithium ion battery cell.

3. A battery pack as claimed in claim 1, and wherein the electronics unit further has a switch that interacts with a switch actuating element.

4. A battery pack as claimed in claim 3, and wherein the switch actuating element is preloaded in a non-actuated condition relative to the switch by a spring which biases the switch actuation element away from the switch.

5. A battery pack as claimed in claim 1, and wherein the first and second light guiding elements are fabricated of a synthetic material.

6. A battery pack as claimed in claim 1, and wherein the first light guiding element is mounted in the battery housing in the manner of a snap-fit.

7. A battery pack for use with a hand-held power tool, comprising:
   a battery, which when appropriately charged, produces a source of electricity for use by a hand-held power tool;
   an electronics unit which is electrically coupled to the battery and operably coupled to the hand-held power tool;
   an emitter of visible light electrically coupled with the electronics unit, and which, when electrically energized by the source of electricity supplied by the battery to the electronics unit, is operable to emit visible light;
   a first light guiding element which has a first light entry face, and an opposite, second, light decoupling face, and wherein emitted visible light produced by the emitter of visible light is received at the first, light entry face, and is passed along the first light guiding element, and departs from the second, light decoupling face, and may be observed from a location which is outside of the battery pack; and
   a second light guiding element mounted on the electronics unit and which has a first light entry face which is located in spaced relation relative to the emitter of visible light, and an opposite, second, light decoupling face which is located in spaced, visible light transmitting relation relative to the first, light entry face of the first, light guiding element, and wherein visible light generated by the emitter of visible light passes along each of the first and second light guiding elements, and can then be observed from a location outside the battery pack, and wherein a source of vibratory energy imparted to the first light guiding element is not transmitted by the first, light guiding element to the electronics unit so as to impede any vibratory damage to the electronics unit.

8. A battery pack as claimed in claim 7, and further comprising:
   a battery housing which defines an internal cavity, and wherein a recess is formed in the battery housing and which extends through the battery housing and is coupled with the internal cavity of the battery housing, and wherein the battery and the electronics unit are received within the internal cavity of the battery housing, and wherein the second, light decoupling face of the first light guiding element is received within the recess defined by the battery housing.

9. A battery pack as claimed in claim 8, and wherein the emitter of visible light comprises a plurality of light emitting diodes (LEDs).

10. A battery pack as claimed in claim 9, and wherein the first, light guiding element is elongated in shape, and further defines a plurality of discrete light guiding zones which individually correspond in number to the plurality of light emitting diodes, and wherein the respective light guiding zones are substantially optically decoupled, one relative to the others, as to the transmission of visible light therebetween adjacently positioned light guiding zones.

11. A battery pack as claimed in claim 10, and wherein the battery comprises a lithium ion battery cell.

12. A battery pack as claimed in claim 11, and wherein the electronics unit further has a switch that interacts with a switch actuating element.

13. A battery pack as claimed in claim 12, and wherein the switch actuating element is preloaded in a non-actuated condition relative to the switch by a spring which biases the switch actuation element away from the switch.

14. A battery pack as claimed in claim 13, and wherein the first and second light guiding elements are fabricated of a synthetic material.

15. A battery pack as claimed in claim 14, and wherein the first light guiding element is mounted in the battery housing in the manner of a snap-fit.

\* \* \* \* \*